Feb. 17, 1959  J. Z. DE LOREAN  2,873,618
TRANSMISSION
Filed Jan. 19, 1956  6 Sheets-Sheet 1

INVENTOR.
JOHN Z. DeLorean
BY
ATTORNEYS.

Feb. 17, 1959 J. Z. DE LOREAN 2,873,618
TRANSMISSION
Filed Jan. 19, 1956 6 Sheets-Sheet 3

INVENTOR.
John Z. DeLorean
BY
ATTORNEYS.

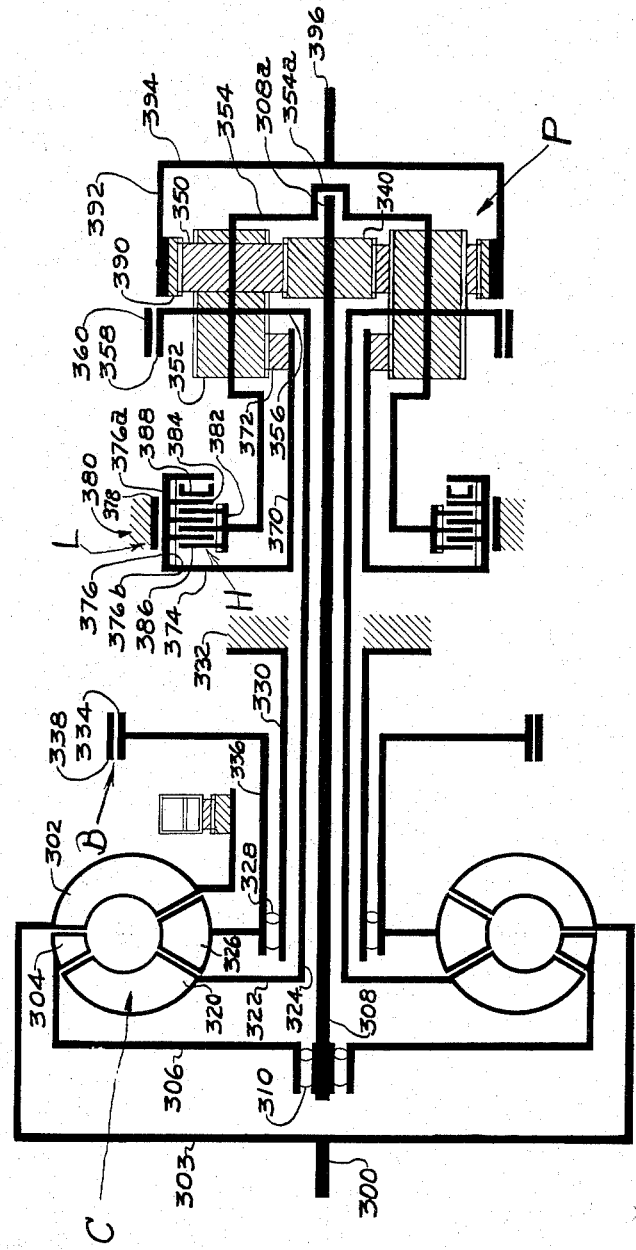

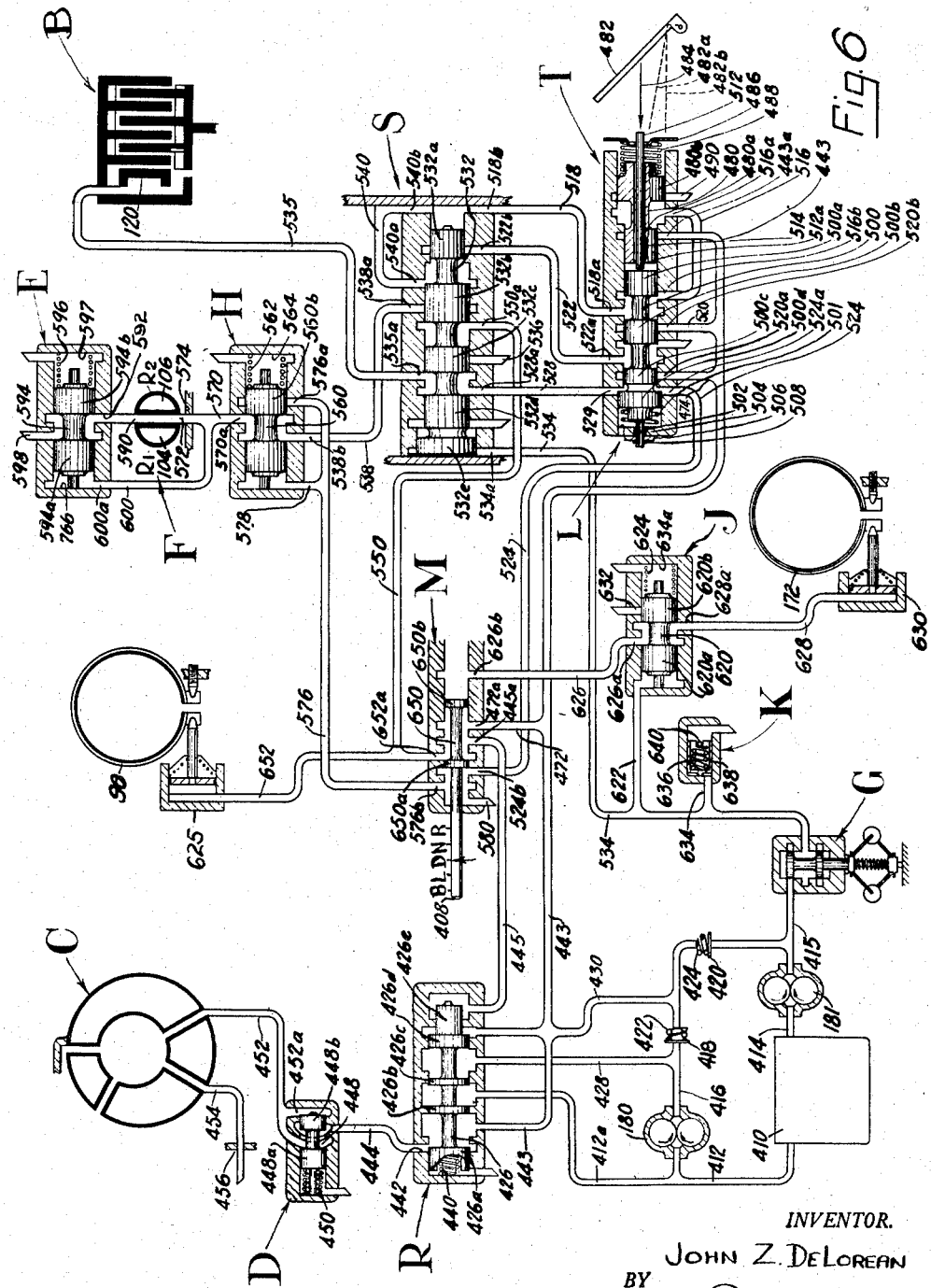

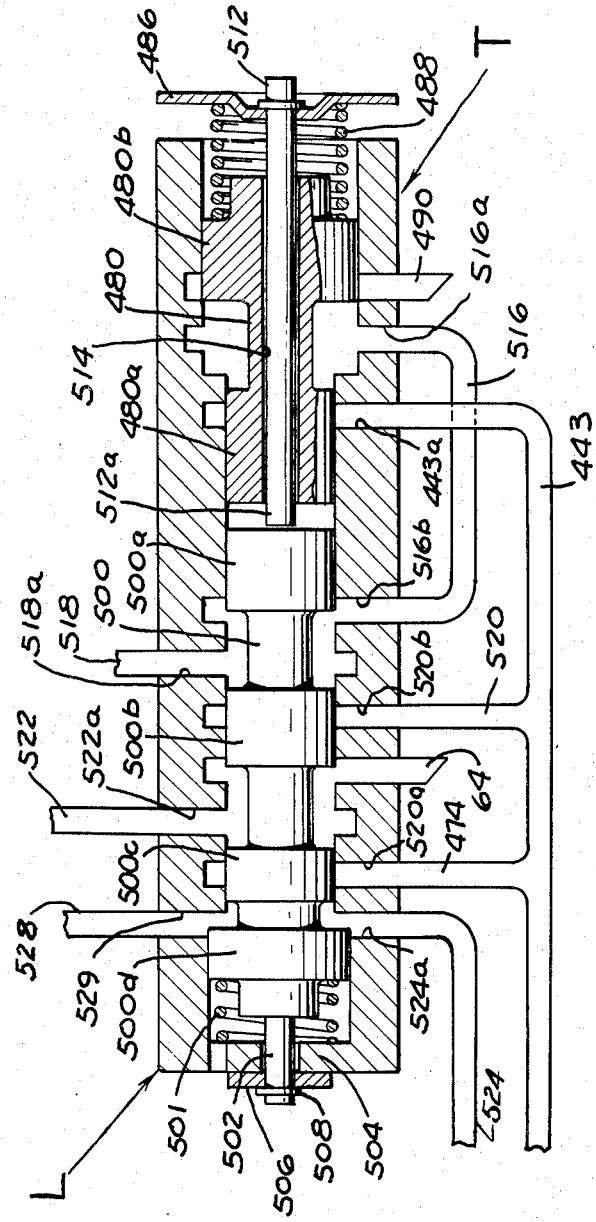

United States Patent Office 2,873,618
Patented Feb. 17, 1959

2,873,618

TRANSMISSION

John Z. De Lorean, Grosse Pointe Woods, Mich., assignor to Studebaker-Packard Corporation, Detroit, Mich., a corporation of Michigan Application January 19, 1956, Serial No. 560,199

7 Claims. (Cl. 74—645)

This invention relates to a multi-speed automatic transmission, and more particularly it relates to a split drive transmission combining a torque converter and a fluid coupling with a gear reduction system, which provides a smooth operation throughout a plurality of driving speed ranges, as well as hydrodynamic braking for the vehicle under coasting conditions.

Various types of split drive transmissions have been developed utilizing a torque converter or a pair of fluid couplings connected with a gear set; however, in these prior arrangements, efficiency of operation and economy of design have been sacrificed in order to obtain smoothness of operation. Even this latter objective has not been satisfactorily attained for all driving conditions, as is apparent from the noticeable unevenness in vehicle operation while accelerating, which is an undesirable characteristic in most modern cars equipped with automatic transmissions. In addition, these transmissions require extremely complicated mechanical or hydraulically operated controls for shifting the transmission, as well as for modulating the operation of numerous clutches and brakes. In this respect, it will be appreciated that complicated controls not only add considerably to the cost of the transmission, but are also unreliable in their operation and difficult to maintain in proper adjustment after the vehicle leaves the manufacturer.

In order to overcome these difficulties, the applicant has devised a new type of differential drive transmission which is particularly adapted for use in conjunction with modern types of high powered engines. Besides being highly efficient in its operation throughout a wide range of driving speeds, it provides the ultimate in smoothness of operation. Further, the simplicity of its design enables it to be manufactured at substantially lower cost than present transmission designs, and does not require the use of costly and complicated controls. The applicant's new transmission is also adaptable for use for a multiplicity of purposes; i. e., it can be used for trucks or cars of different sizes and weights, and with engines of varying characteristics without departing from its basic design.

Another imporatnt feature of the applicant's transmission is that it is adapted to provide selectively operable hydrodynamic braking for the rear wheels of the vehicle under coasting conditions. This is attained by braking the speed of rotation of the engine driven impeller of the converter through the use of the fluid coupling under coast conditions, thereby retarding the speed of rotation of the then overdriven converter turbine member.

Other advantages and features of the applicant's new transmission will be apparent upon reading the following specification together with the accompanying drawings, in which:

Figure 5 is a schematic side elevation of still another modification of the transmission;

Figure 6 is a schematic view of the control system for operating the transmission; and Figure 7 is an enlarged schematic view of several of the valves shown in Figure 6.

Figure 1:
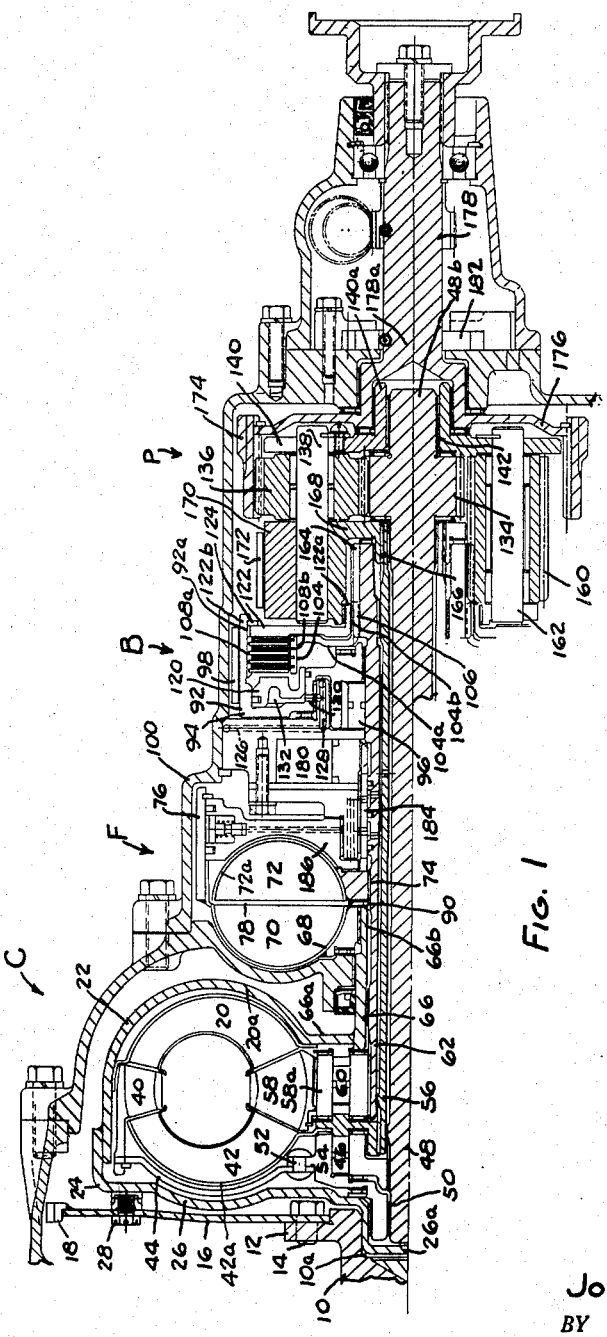
Figure 1 is a sectional side view partly broken away of the transmission.

Figure 1 discloses a split drive automatic transmission including a torque converter C, a fluid coupling F and a planetary gear system P. It will be appreciated that gear systems may be utilized in conjunction with the applicant's transmission design other than that shown, and one such system will subsequently be described in detail.

An engine driven input shaft 10 has a flange 12 formed integral at one end thereof, which is secured by screws 14 to an annular fly wheel 16 of stamped construction. A starter ring 18 is disposed about the outer periphery of the fly wheel 16 for the purpose of cranking the engine. The converter C has a fluid energizing impeller 20 with an outer shell 22. A skirt 24 formed integral with the outer shell 22 is secured to the fly wheel 16 and to the inwardly facing end wall 26 of the converter by screw 28. The converter end wall 26 has a cup-shaped axial portion 26a which is adapted to be fixedly mounted within an axial bore 10a formed in the adjacent end of the drive shaft 10.

The converter C also includes a turbine having a first stage member 40 sometimes referred to as T1 and second stage member 42 sometimes referred to as T2 which are positioned in that order, adjacent the impeller 20. The first stage turbine member 40 is connected by radial element 44 by means of a fastener 52 to a collar 54 acting on to a one-way clutch mechanism 46, which in turn is carried by an intermediate shaft 48. The intermediate shaft is rotatably supported by a suitable bearing 50 within the cup-shaped portion 26a of the converter end wall 26, and is disposed in substantially axial alignment with the input shaft 10. The one-way clutch mechanism 46 serves to lock the first stage turbine member 40 to the intermediate shaft 48 in one direction of rotation; i. e., in the same direction as the normal direction of rotation of the impeller 20. The one way clutch 46 will also permit the intermediate shaft 48 to overspeed or overrun the turbine member 40 without driving said turbine member 40 as will become apparent hereinafter. The outer shell 42a of the second stage turbine member 42 is connected to a collar which is splined to the forward end of a first sleeve member 56, rotatably supported about the intermediate shaft 48.

A reactor member 58 is interposed between the second stage turbine member 42 and the impeller member 20 of the converter C, and its outer flange 58a is connected to a one-way clutch mechanism 60, which in turn is connected about the forward end of a second sleeve member 62 rotatably supported about the first sleeve member 56. The one-way clutch mechanism 60 may be one of several designs apparent to those skilled in the art, and its purpose is to prevent the relative rotation of the reactor with respect to the second sleeve member 62, in one direction; i. e., the opposite direction with respect to the normal direction of rotation of the impeller 20.

The outer shell 20a of the impeller 20 is connected by rivet 64 to a flanged portion 66a of a third sleeve member 66, rotatably supported about the second sleeve member 62. The rearward end 66b of the third sleeve member 66, is splined to the outer shell 68 of the driving runner 70 of the fluid coupling F. Thus, it will be seen that the driving runner 70 is directly driven by the impeller 20 of the converter and the input shaft 10 of the transmission.

The fluid coupling F also includes a driven runner 72, the outer shell 72a of which is splined to the second sleeve 62 as indicated at 74. An exhaust valve 76 is adapted to communicate with the outer end of the radial space 78 defined by the runners 70 and 72 of the coupling, and fluid may be admitted to the coupling through passageway 90 communicating with the inwardly facing end of the radial space 78. While the form and mode of operation of the exhaust valve 76 may be modified in various ways apparent to those skilled in the art, and is shown for the purpose of illustration only, valve 76 will be described in detail in the subsequent description of the transmission controls.

A drum 92 having an integral radially extending portion 94 is connected by a one-way clutch mechanism 96 carried by the second sleeve member 62. The one-way clutch mechanism 96 prevents the relative rotation of the shaft 62 with respect to the drum 92 in one direction; namely, in the direction opposite to the direction of rotation of the impeller. A forward drive brake band 98 is grounded to the transmission casing 100 and is adapted to engage the outer surface of the drum 92. A coast clutch indicated generally at B, which is adapted to lock the drum 92 and the second sleeve 62 against relative rotation in either direction, includes a sleeve member 104 disposed concentrically with respect to the annular interior 92a of the drum 92. The sleeve 104 has an integral radial portion 104a, which connects with a collar 104b, which is splined to the second sleeve member 62, as indicated generally at 106. Alternately interposed friction clutch discs 108a and 108b are splined to the sleeve 104 and the interior surface 92a of the drum 92, respectively. A piston 120, which is adapted to slide within the drum 92, serves to compress the clutch discs 108a and 108b against the fixed cylinder end wall 122. The end wall 122 also has a flanged inner portion 122a, which is rotatably mounted about collar 106, and its outer edge 122b is splined to the inner surface of the drum 92 and is held in position by a snap ring 124. Thus, it will be seen when fluid pressure is admitted through connecting passageways 126, 128 and 130, which communicate with cylinder chamber 132, the piston 120 will be moved in engagement with the clutch discs 108, and as the latter are compressed, the drum 92 will be turned with the second sleeve 62.

A driving sun gear 134 is formed integral near the rearward end of the intermediate shaft 48 and is adapted to mesh with a short planet pinion 136 rotatably supported upon shaft 138, carried by a planet cage 140. The planet cage 140 has a radially disposed sleeve shaped inner portion 140A, which is rotatably supported about the rearward end 48b of the intermediate shaft 48, by bushing member 142. The short pinion 136 is in turn adapted to mesh with a long pinion of smaller diameter 160, which in turn is rotatably supported upon a shaft 162 supported by the carrier 140. The forward end of the short pinion is adapted to mesh with a reaction sun gear 164 which is formed integral with the rearward end of the second sleeve 62. It will be noted that the reaction sun gear 164 is of larger diameter than the driving sun gear 134.

The rearward end of the first or inner sleeve 56 is splined at 166 to a radial element 168 which is drivingly connected with the planet carrier 140, as will be apparent to those skilled in the art. A second annular drum 170 is connected to the radial element 168 and thus to the first sleeve 56, and is disposed about the planet gears. A reverse drive brake band 172, which is fixedly mounted with respect to the transmission casing 100, is adapted to engage and to hold the drum 170, and thus to hold the planet carrier 140 and the first sleeve 56 against rotation in either direction. An internally toothed annular ring gear 174 is disposed about and adapted to mesh with the short pinion gears 136. The ring gear 174 is splined to a flange 176 formed integral with the forward end 178a of the transmission output shaft 178.

A front pump indicated generally at 180 for supplying fluid pressure for the transmission controls is driven by a sleeve 184 rotatably supported about a central portion of a second sleeve member 62. The sleeve 184 is drivingly connected at its forward end by member 186, which is fixedly connected to the outer shell 68 of the driving runner 70 of the coupling. Thus, it will be seen that the front pump 180 is driven directly by the input shaft 10 of the transmission, as is the driving runner 70 of the coupling F. The output shaft is adapted to drive, through gears not shown, a rear pump 181, and thus it will be seen that the latter pump is driven only when the output shaft 178 is driven in a forward driving direction.

To enable the reader to better understand the driving relationship between the various components of the transmission described above, reference may be had to Figure 2, which discloses a schematic view of the detail drawing of the transmission shown in Figure 1. The operation of this transmission, as well as the inter-related function of its various components will be apparent upon reading the following description:

When the input shaft 10 is initially driven by a suitable power source, the impeller 20 of the converter C drives the first stage turbine member 40, which in turn drives the intermediate shaft 48 through the one-way clutch 46, and the driving sun gear 134. Sun gear 134 drives short pinion 136, which in turn drives the long pinion 160. If the forward drive brake band 98 is then applied to the drum 92 (coast clutch B being inoperative and the coupling F exhausted of fluid), the reaction sun gear 164 is held by the one-way clutch mechanism 96 against rotation in the direction which it would normally be driven by the reaction force developed by the rotation of the long pinion 160. As a result, the long pinion 160 is walked about the held reaction sun gear 164, and the carrier member 140 and the short pinion 136 drives the ring gear 174 and the output shaft 178 in a forward driving direction, in low gear range.

As the speed of the input shaft 10 increases, and the second stage turbine member 42 approaches the speed of rotation of the impeller 20, the first sleeve 56 is rotated relative to the intermediate shaft 48 at a preset speed ratio as determined by the gear set. The first sleeve member 56, which is connected with the planet carrier 140 through the connecting radial member 168 drives the carrier 140 at the same speed as said sleeve member 56. As the carrier is rotated, the long pinion 160 is walked about the held reaction sun gear 164, and thus the drive path is through the long pinion 160 to the short pinion 136, and the latter drives the ring gear 174 and the output shaft 178 at an intermediate speed. As the output shaft is driven, the driving sun gear 134, which also meshes with the short pinion 136, as well as the intermediate shaft 48, are lifted off the one-way clutch 46 and are rotated at a greater speed than the first stage turbine member 40. It will be noted that while operating in low range and intermediate range, there is a fixed proportional relationship between relative speeds of rotation of the first and second stage turbine members 40 and 42 which is preset by the ratios designed into the gear set.

High range drive, i. e., a 1:1 driving ratio, is obtained by filling the fluid coupling F, and the driven runner 72 thereof, is rotated at substantially the same speed as the driving runner 70; the latter being directly connected to the converter impeller 20 and the transmission input shaft 10, as heretofore explained. The driven runner 72 drives the second sleeve 62 and the reaction sun gear 164; the second sleeve 62 then being lifted off the one-way clutch mechanism 96. Since the reaction sun gear 164 and the planet carrier 140 are then driven at substantially the same speeds, the planet gears are thus locked, and a 1:1 drive ratio is imparted through the ring gear 174 to the output shaft 178.

From the above description of the operation of the transmission, it will be seen that a smooth transition through three or more driving speed ranges may be obtained without necessitating the engagement of three or more transmission clutches or brakes, as would normally be required in the present types of transmissions providing the same number of driving ranges. In addition to the advantage of eliminating all but one brake to condition the transmission to drive the vehicle in a forward direction, it will also be appreciated that the control system required to operate the forward drive brake band 98 does not require complicated modulation or rate control mechanisms to insure a smooth transition through the various driving ranges. The control system to operate this transmission, which will subsequently be described in detail, may include either a simple hydraulic or mechanically operated control which may be selectively operated by the conventional manual selector mounted on the steering column or instrument panel of the vehicle.

To condition the transmission to operate in manual low, the forward drive brake band 98 is applied to drum 92, and fluid pressure is admitted to the coast clutch cylinder 132 (see Figure 1), thus moving piston 120 into engagement with the clutch discs 108a and 108b, thereby locking the drum 92 to the second sleeve 62. At the same time, the fluid in the fluid coupling F, if any, is exhausted. Under these conditions, torque from the input shaft 10 is imparted to the converter impeller 20, which in turn drives the first stage turbine member 40, and the latter in turn drives the intermediate shaft 48 and the driving sun gear 134. The driving sun gear 134 acts to drive the small pinion 136 and the latter drives the long pinion 160. The long pinion 160 is walked about the held sun gear 164, thereby driving the carrier 140 and the short pinion 136, while the latter drives the ring gear 174 and the output shaft 178 in a forward low driving range. It will be seen the reaction torque applied to the sun gear 164 is sustained by both the coast clutch B and the one-way clutch 96, and by the application of forward band 98 to drum 92. Also, it will be noted that output shaft 178 is prevented from over-driving the reaction sun gear 164, which would be possible by virtue of the one-way clutch 96, if the coast clutch B were not applied. Thus, in manual low, a positive drive is maintained between the engine and the driving wheels of the vehicle.

Another outstanding feature of the applicant's transmission is that it is adapted to provide increased torque multiplication, almost immediately upon the demand of the vehicle operator. For example, when driving under normal high range driving conditions (forward brake band 98 applied to drum 92, the coast clutch B inoperative and the coupling F filled with fluid) if the vehicle operator desires a sudden increase in speed to pass another vehicle, the fluid coupling F may be rapidly exhausted of fluid by opening the coupling exhaust valve 76 (see Figure 1). Normally, the opening of the exhaust valve 76 may be accomplished by a mechanical arrangement whenever the conventional engine accelerator is depressed beyond its normal maximum throttle position. However, it is to be understood that other arrangements, apparent to those skilled in the art, may be utilized to condition the valve 76 to exhaust the fluid in the coupling F. Under these conditions, as previously explained, the transmission drives the output shaft 178 at an intermediate speed range with the drive path being through the impeller 20, the second stage turbine member 42, the first sleeve 56, and the carrier 140 etc. It will also be appreciated that under relatively low engine torque output conditions, a still greater degree of torque multiplication (low driving range) may be obtained, if the increased engine torque then available is sufficient to increase the speed of rotation of the first stage turbine 40 sufficiently with respect to the second stage turbine member 42. If this occurs, it will be seen that the transmission will then be conditioned to operate in low range drive with the drive path being through the converter impeller 20, the first stage turbine 40, the intermediate shaft 48 and the driving sun gear 134 etc., in the manner previously described.

It will also be seen that when the vehicle operator reduces the engine throttle and thus reduces the speed of rotation of the impeller 20, or whenever the speed of rotation of the second stage turbine member 42 once again approaches the speed of rotation of the converter impeller 20 and drives the planetary gears P through the first sleeve 56, the output shaft 178 will again operate in an intermediate driving range. In the same respect, when the vehicle operator depresses the engine throttle, the fluid coupling exhaust valve 76 may be conditioned to close, and fluid be admitted to the coupling and thus, the transmission is once again conditioned to drive the output shaft 178 at a 1:1 or high speed range.

The purpose and mode of operation of the coast clutch B will next be described in detail.

The purpose of the coast clutch B is to adapt the transmission to provide a highly efficient braking action for the vehicle wheels, utilizing engine friction and the mechanical advantage provided by the planetary gears. When the coast clutch B is operated, the forward brake band 98 is applied to drum 92, and fluid is admitted to the coupling F. When the output shaft 178 tends to overspeed the input shaft 10, a reverse drive path through the transmission is initiated. Thus, the output shaft 178 drives the ring gear 174, the small pinion 136 and the long pinion 160. The carrier 140 is thereupon rotated as the long pinion 160 is walked about the held reaction sun gear 164, driving with it the second stage turbine member 42 through the first sleeve 56. At the same time, the normally driven runner 72 is held in a fixed position with respect to the first sleeve 56 by the coast clutch B and the forward brake band 98. With the coupling F filled with fluid, it will be seen that the speed of rotation of the normally driving runner 70 is rapidly retarded, and thus the speed of rotation of the converter impeller 20, the input shaft 10, and the vehicle engine are rapidly reduced to a near idling speed. As a result of the then relatively low speed of rotation of the converter impeller 20 and the relatively high speed of rotation of the over-driven second stage turbine member 42, a high degree of braking action occurs therebetween, and this braking action is transmitted to the output shaft 178 through the second stage turbine 42, and sleeve 56, the carrier 140, the short pinion 136 and the ring gear 174 etc. In this connection, it will be noted that during the coast brake operation, little if any braking action occurs between the first stage turbine member 40 and the converter impeller 20, due to the fact that the former is lifted off the one-way clutch 46.

In order to condition the transmission to operate in reverse drive, the forward brake band 98 and the coast clutch B are released, the fluid coupling is exhausted of fluid, and the reverse band 172 is applied to the carrier connected drum 170. Thus, it will be seen that the carrier 140 is held in a fixed position with respect to the driving sun gear 134. As the converter impeller 20 drives the first stage turbine member 40, the intermediate shaft 48 and the driving sun gear 134 are rotated, driving the small pinion 136, which in turn drives the ring gear 174 and the output shaft 178 in a reverse direction. In addition, part of the reaction torque of the converter is delivered to the reaction sun gear 164 through sleeve 62, by the converter reactor 58, which is rotated in a reverse direction by the forward rotation of the impeller and turbine members. In this connection, it will be noted that the reactor supporting sleeve 62 is not locked against rotation by forward band 98 so that the tendency for the reactor 58 to rotate in the direction opposite to the impeller 20 will produce an added reverse drive torque on the reaction sun gear 164. The reaction sun gear 164, therefore, also drives long pinion 160, assisting the latter in driving the ring gear 174 and output shaft 178 in a reverse direction.

Figure 2:
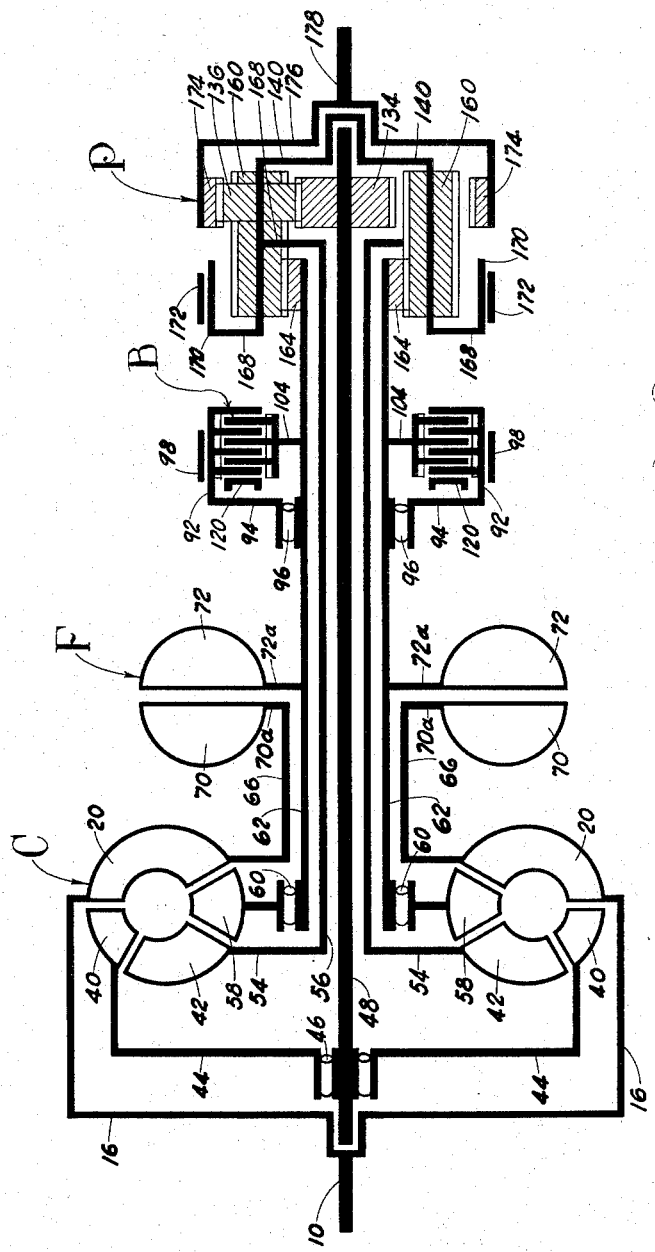
Figure 2 is a schematic side elevation of the transmission shown in Figure 1.
Figure 3:
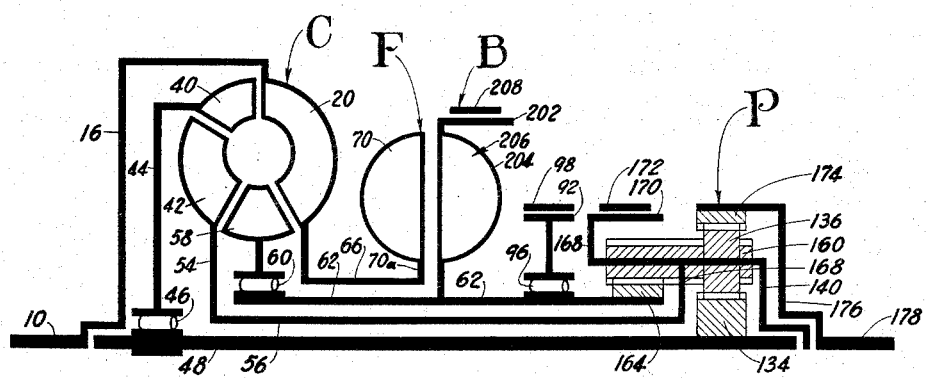
Figure 3 is a schematic side elevation of a modification of the transmission shown in Figures 1 and 2.

Figure 3 discloses a modification of the transmission design shown in Figures 1 and 2, which is similar in most respects except for the coast clutch arrangement indicated generally at B'. Here it will be noted that an annular collar 202 is connected to the outer shell 204 of the driven runner 206 of the fluid coupling F. A coast brake band 208 is adapted to engage the annular collar or drum 202 to hold the driven runner 206 and the second sleeve member 62 in a fixed position with respect to the transmission casing. Thus, it will be seen that the coast brake arrangement $B^1$ of Figure 3 serves the same purpose as the coast clutch B, of Figures 1 and 2. In all other respects, the transmission shown in Figure 3 operates in the same manner as the form of the transmission previously described.

Figure 4:
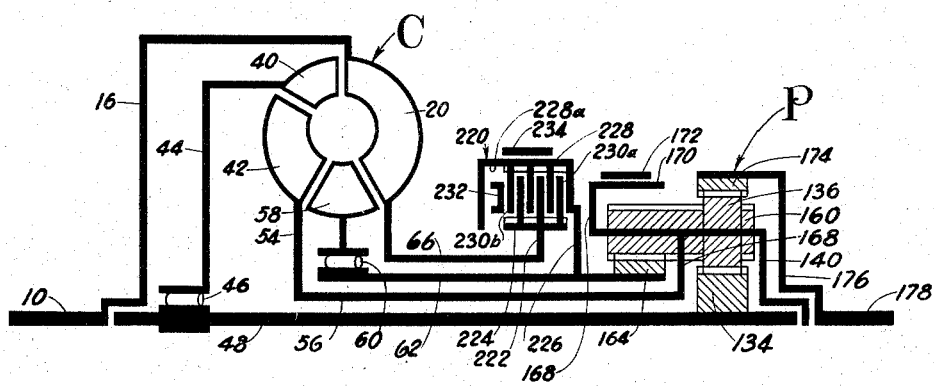
Figure 4 is a schematic side elevation of another modification of the transmission shown in Figures 1 and 2.

Figure 4 discloses a further modification of the transmission arrangement shown in Figures 1 and 2, which is similar thereto in most respects except that a multiple disc type clutch 220 for engaging the high range drive is utilized in place of the fluid coupling F of Figures 1 through 3. In the modification shown in Figure 4, it will be seen that the converter impeller 20 is connected to a third sleeve 66, which is of relatively short length and is adapted to be rotatably disposed about the second sleeve 62. Sleeve 66 is connected to a radial element 222, which in turn connects with an annular drum 224, concentrically disposed about the intermediate shaft 48, and first and second sleeves 56 and 62, respectively. The second sleeve 62 is connected by a second radial member 226 to an outer annular shaped drum 228, which is dis-230b are alternately splined to the inner drum 224 and the annular interior surface 228a of the outer drum 228, respectively. The clutch discs 230a and 230b are alternately interposed between each other and are adapted to be compressed and held at friction tight engagement by a piston 232, thereby drivingly connecting the converter impeller 20 with the second sleeve 62 and the reaction sun gear 164.

A forward drive brake band 234 is disposed about the annular drum 228 and is adapted to be engaged therewith to hold the second sleeve 62 and the reaction sun gear 164 in a fixed position with respect to the transmission casing. As in the previously described modifications, when the forward brake band 234 is applied to drum 228, the reverse band 172 is released from the carrier drum 70, and the high range clutch 220 is released, the transmission is first conditioned to drive the output shaft 178 in low range drive. Thus, the drive path is through the converter impeller 20, the first stage turbine member 40, the intermediate shaft 48, the driving sun gear 134, the short pinion 136, the long pinion 160, which is walked about the held reaction sun gear 164, and thus, as the carrier 140 is rotated, the short pinion 136 drives the ring gear 174 and the output shaft 178 in low range drive. As the engine torque increases, and the speed of the second stage turbine member 42 approaches the speed of rotation of impeller 20, the drive path is through the second stage turbine member 42, the first sleeve 56, connecting with the carrier 140. Thus, as the long pinion 160 is walked about the held reaction sun gear 164, the short pinion 136 drives the ring gear 174 and the output shaft 178 in an intermediate driving range. At the same time, the short pinion 136 overdrives the driving sun gear 134, which, together with the intermediate shaft 48, is lifted off the one-way clutch mechanism 46, thus braking its driving relationship with the first stage turbine member 40.

In order to obtain the high range or 1:1 driving ratio, the high range clutch 220 is operated, and the forward drive brake band 234 is released from engagement with the drum 228. Thus, the converter impeller 20, which is engine driven, is drivingly connected through clutch 220 with the second sleeve 62 and the reaction sun gear 164 with the result that the latter is driven at a 1:1 ratio with the engine. Since the carrier 140, which is driven by the second stage turbine member 42, as well as the reaction sun gear 164 is then driven at substantially the same speed, the planetary gears are locked and the short pinion 136 rotates the ring gear 174 and the output shaft 178 at substantially a 1:1 driving ratio.

The kick-down arrangement for the modification shown in Figure 4 may be obtained by releasing the high range clutch 220 and re-applying the forward brake band 234 to drum 228. The kick-down operation may be controlled by depressing the conventional engine accelerator beyond its normal maximum throttle position, and its mode of operation will be described in detail in the subsequent description of the transmission controls. However, it is to be understood that if desired, other arrangements for operating the kick-down arrangement, apparent to those skilled in the art, may be utilized.

The transmission is conditioned to operate in reverse drive in a similar manner to that discussed in connection with Figures 1 through 3; the reverse band 172 being applied to the carrier drum 170, the forward band 234 and the high range clutch released, and the drive path being through the first stage turbine member 40, the intermediate shaft 48, the driving sun gear 134, the small pinion 136, the ring gear 174 and the output shaft 178.

Figure 5 discloses a further modification of the transmission arrangements described above, having a modified form of high range drive and coast brake operation. In Figure 5, it will be seen that the input shaft 300 drivingly connects the impeller member 302 of the converter C through fly wheel 303. The converter C includes a first stage turbine member 304 which is connected by radial element 306 with the intermediate shaft 308 through a one-way clutch mechanism 310. The intermediate shaft 308 is disposed in substantially axial alignment with the input shaft 300, and the one-way clutch mechanism 310, as will be apparent to those skilled in the art, prevents the relative rotation of the first stage turbine 304 with respect to the intermediate shaft 308, in one direction.

The converter C also includes a second stage turbine member 320, which is drivingly connected through a radial supporting element 322 to the forward end of a sleeve 324, which is rotatably supported about the intermediate shaft 308. The reactor member 326 of the converter is connected through a one-way clutch mechanism 328 to a short sleeve member 330 disposed about a forward portion of the first sleeve 324. The short sleeve member 330 is fixedly connected to the transmission casing, as indicated at 332. As is the general practice in the art, the one-way clutch mechanism 328 serves to prevent the reactor 326 from rotating in one direction; i. e., opposite the normal direction of the impeller 302. The reactor 326 is also connected to an annular drum 334 by an outer sleeve 336 which is rotatably mounted about the short sleeve member 330, and forms a part of the coast brake $B^{11}$. A coast brake band 338, fixedly connected to the transmission casing, is adapted to be selectively engaged with the drum 334 to hold the reactor 326 against rotation in either direction. The purpose and function of the coast brake "B", as well as its mode of operation, will subsequently be described in detail.

A driving sun gear 340 is fixedly mounted near the rearward end of the intermediate shaft 308, and is adapted to mesh with a short planet pinion 350 of the planetary gear system P, which in turn meshes with a long planet pinion 352. The pinions 350 and 352 are rotatably supported by a carrier 354 having an axially disposed hub portion 354a which is rotatably supported about the rearward end 308a of the intermediate shaft 308.

The inner sleeve 324, which is connected at its forward end with the second stage turbine 320, is connected with the pinion carrier 354 at its rearward end by a radially extending element 356. Radial element 356 in turn is connected to an annular drum 358 which extends about the planet carrier 354 and is adapted to be engaged and held by a reverse brake band 360.

A second short sleeve member 370, rotatably disposed about a rearward portion of the inner sleeve 324 and the intermediate shaft 308, fixedly supports a reaction sun gear 372 which is adapted to mesh with the long pinion 352. The short sleeve member 370 is connected by radial member 374 with an annular brake drum 376, forming a port of the low range brake L. The outer surface 376a of the drum 376 is adapted to be engaged by a low range brake band 378 carried by the transmission casing, as indicated at 380. Thus, it will be seen, that when the low range brake 378 is applied to the drum 376, the reaction sun gear 372 is held in a fixed position with respect to intermediate shaft 308 and the inner sleeve 324.

The pinion carrier 354 is connected to an inner drum 382 which is rotatably supported about the second short sleeve member 370 in a spaced apart and concentric relation to the brake drum 376, forming therebetween a housing for the high range clutch H. Alternately interposed clutch discs 384 and 386 are alternately splined to the internal surface 376b of the drum 376 and the inner drum 382, respectively. When the clutch discs 384 and 386 are compressed by a hydraulically operated piston 388, it will be seen that the reaction sun gear 372 and the pinion carrier 354 are locked together.

An internally toothed ring gear 390 carried by an annular collar member 392 is adapted to mesh with the short pinion 350. The collar 392, in turn, is rigidly connected by a flanged portion 394 of the output shaft 396, disposed in substantially axial alignment with the input and intermediate shafts. The following is an operational description of the form of the transmission shown in Figure 5.

To condition the transmission shown in Figure 5 to operate in low range drive, the low brake band 378 is applied to drum 376 to hold the reaction sun gear 372 against rotation. When engine torque is first applied to the input shaft 300, the impeller member 302 of the converter C first commences to drive the first stage turbine 304. The first stage turbine 304 in turn drives the intermediate shaft 308 and the driving sun gear 340. The sun gear 340 drives the short pinion 350, which drives the long pinion 352, with the result that the latter is walked about the held reaction sun gear 372, driving the pinion carrier 354 with it. Thus, it will be seen that the short pinion 350 drives the ring gear 390 and the output shaft 396 in the same direction as the intermediate and input shaft, in a low gear range.

As the engine torque increases and the second stage turbine 320 commences to rotate at substantially the same speed as the impeller 302, the second stage turbine 320 drives the first sleeve member 324 and the carrier 354, and the long pinion 352 is walked about the held reaction sun gear 372. Under these conditions, the long pinion 352 drives the short pinion 350, which in turn drives the ring gear 390 and the output shaft 396 in the same direction as the intermediate shaft, in an intermediate gear ratio. It will be noted that, as the short pinion 350 is driven, it tends to overdrive the smaller sun gear 340, and the intermediate shaft 308, and the latter is lifted off the one-way clutch 310 and permitted to rotate freely at a greater speed than the first stage turbine 304.

In order to obtain a 1:1 or high range driving ratio, the low range brake L is released and the high range clutch H is operated to lock the reaction sun gear 372 and the pinion carrier 354. Under these conditions, it will be seen that the planetary gear system P is locked and thus, as the carrier 354, the drum 376 and the inner sleeve 324 are driven by the second stage turbine 320 of the converter C, the short pinion 350 drives the ring gear 390 and the output shaft 396 at a 1:1 gear ratio.

It will be appreciated that while operating the vehicle in high range drive, an intermediate driving range may be obtained by rendering the high range clutch H inoperative, and by re-applying the low range brake L. Further, it will be seen that an increase in torque multiplication may also be delivered by the torque converter C, while operating in an intermediate driving range. If, for example, the converter is then driving the planetary gear system P through the second stage turbine 320, and a rapid increase in engine torque is delivered to the impeller 302, the second stage turbine 320 will no longer drive the planetary gears, and the drive path will then be through the first stage turbine 304, the intermediate shaft 308 and the driving sun gear 340 etc. As explained above, this drive path conditions the planetary gears to drive the output shaft 396 in low driving range.

As will be apparent to those familiar with the art, the conditioning of the transmission to operate in the intermediate gear ratio (high range clutch H released, and low range brake L applied) will normally be controlled by depressing the engine accelerator beyond its maximum throttle position. Thus, the increased torque multiplication through the converter C will be delivered to the output shaft 396 at the same time the low band is engaged, providing that there is a then sufficient increment in engine torque available to drive the planetary gears through the first stage turbine 304 and the one-way clutch mechanism 310. It will be appreciated, however, that other arrangements may be utilized to operate this kickdown arrangement, if desired.

To condition the transmission to provide coast braking, brake band 338 may be applied to drum 334, in any forward driving range; however, it will be apparent that its effectiveness will be greatest when the transmission is operating in low gear ratio. As will be seen in Figure 5, brake drum 334 is connected by the short outer sleeve 336 with the reactor 326 of the converter C, and as the band 338 is applied to the drum, the reactor 326 is held in a fixed position with respect to the impeller and turbine members of the converter. Thus, the toroidal fluid flow through the converter is limited or blocked by the reactor, and consequently a relatively efficient braking action occurs between the turbine members 304 and 320, and the impeller 302, due to inefficient operation of the turbine.

To operate in Reverse drive, the high range clutch H and the low range brake L are released, and the reverse brake band 360 is applied to the carrier drum 358. As engine torque is applied to the input shaft 300, the converter impeller 302 drives the first stage turbine 304, which in turn drives the intermediate shaft 308 and the driving sun gear 340. The sun gear 340 drives the short pinion 350, which in turn drives the ring gear 390 and the output shaft 396 in a reverse direction. It will be noted that as the short pinion 350 is rotated, it also drives the long pinion 352, and the latter drives the reaction sun gear 372, which is permitted to rotate freely, because the low brake band 378 is released from engagement with the carrier drum 376.

Before proceeding with a detailed description of the transmission controls it will be appreciated that in all of the modifications previously described, the operation of only one clutch band is required to obtain low and intermediate range. Thus, a planetary gear set is adapted to provide three forward speed ranges (in addition to manual low, coast braking and reverse) by the operation of the forward band and the fluid coupling (or high range clutch 220 of Figure 4), where in conventional types of transmissions three or more servo brakes or clutches are required to accomplish the same results. In addition, in each of the modifications above described, coast braking is provided by overdriving the converter turbine members while braking either the reactor or impeller members of the converter.

The sequence of operation of the transmission brakes and clutches and the hydraulic controls for operating same will next be described in detail. Also, a chart indicating the order of operation of the brakes and clutches throughout the different driving ranges is set forth below:

| Manual Selector Range | Converter | Forward Drive Band | Fluid Coupling (or High Range Clutch) | Reverse Band | Coast Brake |
|---|---|---|---|---|---|
| Drive "D": | | | | | |
|   a. Low | T1 | On | Off | Off | Off |
|   b. Intermediate | T2 | On | Off | Off | Off |
|   c. High | T2 | On | On | Off | Off |
|   d. Kickdown | T1 or T2 | On | Off | Off | Off |
| Manual Low "L": | | | | | |
|   a. Low | T1 | On | Off | Off | On |
|   b. Intermediate | T2 | On | Off | Off | On |
|   c. High | (Forced upshift) | On | On | Off | On |
| Hydrodynamic Braking "B" | T2 vs. Impeller | On | On | Off | On |
| Reverse "R" | T1+Reactor | Off | Off | On | Off |

Transmission controls

The transmission controls which are diagrammatically shown in Figure 6 are described principally in conjunction with the form of the transmission shown in Figures 1 and 2, but it will be apparent that similar controls may be utilized to operate the other modifications of the transmission shown in Figures 3, 4, and 5. Also, it will be noted that this control system is substantially the same as that described in my co-pending application, Serial No. 560,201, filed January 19, 1956, now Patent No. 2,851,906. It is to be understood that other forms of control arrangements and different types of control valves may be utilized to operate the above transmissions, as will be apparent to those skilled in the art, and the control system next to be described is for the purpose of illustration only.

From an initial review of Figure 6, is will be seen that the principal components of the control system shown therein, are pressure regulator valve R, manual selector valve M, throttle valve T, low valve L, shift valve S, and the control valves H and E for the fluid coupling F. The pressure regulator valve R controls the operation of the front and rear pumps 180 and 181 respectively, and the admission of fluid to the converter valve D and the converter C. As is the common practice in transmissions of this general type, the front pump 180 is driven by the engine as shown in Figure 1, and rear pump 181 may be driven by the output shaft 178 in the conventional manner. Thus, the front pump delivers fluid pressure to the system as soon as the engine is operating, and the rear pump is adapted to deliver pressure to the control system only when the transmission output shaft 178 is driven in a forward driving direction.

Throttle valve T is designed to deliver an increasing throttle pressure in proportion to the throttle increasing position of the engine accelerator pedal 482, to one side of shift valve S. Governor G is adapted to supply an increasing governor pressure to the opposite side of the shift valve S, in direct proportion to the forward driving speed of the vehicle. At certain values of governor and throttle pressure, shift valve S is moved to either its right or left hand position, thereby controlling the admission of fluid to the coupling F and the coast clutch B. The governor G may be of any conventional design well known to one familiar with the art, and its specific form of construction does not form a part of this invention.

Low valve L in conjunction with shift valve S controls the admission of fluid pressure to the coast clutch B. The manual selector valve M is operated in the conventional manner by a manual selector lever, and may be positioned in one of five positions; namely, reverse "R," neutral "N," forward drive "D," manual low "L," and coast braking "B," as indicated at 408. The effect of moving the manual selector valve to one of these five positions will subsequently be described in detail.

Before proceeding with a detail description of the control valves, it will be appreciated that the forward servo 624 and the reverse servo 630 are utilized to operate the forward drive band 98, and the reverse band 172, shown in Figures 1 and 2. The forward and reverse servos may be of any conventional design well known to those skilled in the art, and their particular form of construction does not form a part of this invention.

As will be seen in Figure 6, the front and rear pumps 180 and 181 are connected with a hydraulic fluid reservoir 410 by conduits 412 and 414, respectively. Outlet conduit 415 of rear pump 181 connects with the hydraulic governor G, and thus hydraulic fluid is not delivered to the latter, unless the transmission output shaft is rotated in a forward driving direction. The capacity of front pump 180 is larger than that of the rear pump 181, and the outlets of each are connected by a fluid gallery 416. As mentioned above, the output of rear pump 181 increases in substantially direct proportion to vehicle speed, so that at a predetermined vehicle speed its output is equal to or greater than that of the front pump 180. To control the operation of the pumps, check valves 418 and 420 are connected in series with the gallery 416. Check valve 418 is biased closed by spring 422 against the front pump output pressure, and check valve 420 is biased closed by spring 424 against the rear pump output pressure. When the engine is started the front pump output pressure opens check valve 418 and the pressure flowing therethrough assists spring 424 in holding the rear pump check valve 420 closed. As the vehicle speed increases and the rear pump pressure exceeds that of the front pump, check valve 420 is opened, and the front pump check valve 418 is closed.

The regulator valve R is connected with gallery 416 by lines 428 and 430, which communicate therewith on opposite sides of the front pump check valve 418, and with reservoir 410 through return line 412a. The regulator valve R includes a valve member 426 having lands 426a, 426b, 426c and 426d of equal diameter and a right hand land 426e of smaller diameter. Valve member 426 is normally biased to the right by a spring 440 so that land 426a closes port 442 communicating with converter valve D and converter C.

As the vehicle engine is started, pressure from front pump 180 is delivered through conduit 428 between lands 426c and 426d; the latter two being of equal diameter and, therefore, valve member 426 remains unmoved. At the same time, front pump pressure from line 430 is delivered to the right side of land 426d, thereby tending to move valve member 426 to the left, against the action of spring 440, whereby port 442 is uncovered and the fluid flows to the converter to start the car in motion. As the vehicle commences to move in a forward direction, and the pressure from the rear pump 181 is built up to exceed that of the front pump 180, check valve 420 is opened and the front pump check valve 418 is closed, and the higher rear pump pressure is then delivered through conduit 430 to the right side of land 426d. In addition, when the manual selector valve M is in any one of its forward driving positions, pump pressure from conduit 430 is delivered through conduit 443 to valve M and to conduit 445 to the right side of land 426e, thereby adding to the pressure tending to move valve member 426 to the left.

When valve member 426 is moved a sufficient distance to the left, such that port 442 is moved somewhat past its initial opening position, then land 426c is unseated, and front pump pressure from line 428 is permitted to flow between lands 426c and 426d, to return line 412a. Upon further movement of valve 426 to the left, land 426d is unseated and pressure from line 430 is allowed to enter return line 412a so that pressure behind lands 426d and 426e is reduced as is the pressure being supplied through port 442 to the converter. Therefore, it will be seen that regulator valve R is adapted to regulate the maximum pressure delivered by front and rear pumps to the system.

As above stated, it is only when valve member 426 is moved to the left that land 426a uncovers port 442, permitting pressure from line 430 and 443 to flow therethrough to line 444 connecting with converter valve D. Thus, the regulator valve R also is adapted to insure that the converter C is supplied with fluid only after the other transmission controls are supplied adequate operative pressure.

The converter valve D serves as a pressure limit valve and includes valve member 448, having right and left hand lands 448a and 448b of equal diameter. Valve member 448 is biased in an open position by coil spring 450, so that pressure from line 444 is permitted to flow between the lands to the converter C, through line 452. The pressure in line 452 is also conducted through branch conduit 452a to the right side of valve land 448b, thereby tending to move valve member 448 to the left, against the action of spring 450. As valve member 448 is moved to the left, land 448b tends to close line 444, thereby reducing the pressure flow therethrough. As a result, the pressure flowing to converter C can never exceed a predetermined limit; this limit being determined by the force of spring 450. The converter C, it will be seen, has a return line 454 which may be connected with a sump in the reservoir 410 in the conventional manner. A restricted orifice 456 is connected in series with line 454, and serves to maintain pressure in the converter.

Pump pressure from line 430 is also delivered to the throttle control valve T by line 443, and in addition, branch conduits 472 and 474 communicating therewith connect with the manual selector valve M and the low valve L, respectively. The throttle valve T and the low valve L include valve members 480 and 500, respectively, which are disposed in substantially axial alignment. An engine accelerator 482 is connected by linkage indicated at 484 with a spring retainer 486, and a coil spring 488 is interposed between the right hand end of throttle valve member 480 and the retainer 486. When the engine is not running, valve member 480 is in its left hand position, with land 480a uncovering port 443a. Thus, as soon as the engine is started, pump pressure from line 443 is admitted through port 443a, and due to the larger area of land 480b, valve member 480 is moved to the right so that land 480a covers port 443a. As the engine accelerator 482 is moved from its idle throttle position, as shown, towards it maximum throttle position indicated at 482a, a greater force is applied through spring 488 tending to move valve member 480 to the left in opposition to the pump pressure acting on land 480b, opening port 443a. As a result, a modulated throttle pressure is permitted to flow between lands 480a and 480b to a centrally disposed port 516a, which is substantially proportional to the throttle opening position of the engine accelerator 482.

A coil spring 501 is disposed about the left hand end of low valve member 500, and the latter is reciprocally mounted through an opening 502, in valve casing 504. Spring 501 tends to move valve member 500 to the right, and a washer 506 and snap ring 508 serve to limit the right hand movement of the low valve member 500.

A kickdown rod 512 is reciprocally mounted in an axial opening extending through throttle valve member 480, and its opposite ends are adapted to engage the right hand end of the low valve member 500 and throttle valve spring retainer 486, respectively. Thus, when the engine accelerator 482 is moved to its kick-down position, indicated at 482b, spring retainer 486 moves kickdown rod 412 to the left, and thus the latter positively moves low valve member 500 to its left hand position, with the result that the transmission is then conditioned to operate in low or intermediate range, in a manner subsequently to be described in detail. In this connection it will be noted that kick-down rod 512 is arranged so that it moves valve member 500 to the left, only when the accelerator pedal 482 is depressed beyond its maximum throttle position.

Port 516a of throttle valve T is connected by line 516 with a radial port 516b in low valve L, and thus throttle pressure is admitted to the latter. As the engine accelerator 482 is moved towards its maximum throttle position, a proportionately increasing throttle pressure is delivered through line 516 to the low valve L by virtue of the metering action occurring between lands 480a and port 443a.

Low valve member 500 is formed with lands 500a, 500b and 500c of equal diameter, and land 500d of larger diameter disposed about its left hand portion. When valve member 500 is in its right hand position, land 500a uncovers port 516b, and lands 500b and 500a are disposed on opposite sides of port 518a connecting with conduit 518, which in turn connects with the right hand end of shift valve S. Lands 500c and 500b cover ports 520a and 520b connecting with opposite ends of passageway 520; the latter being connected with branch conduit 474. A radial port 522a is disposed between lands 500c and 500b, and is connected by conduit 522 with radial port 522b near the right hand end of shift valve S. An annular port 524a is connected by conduit 524 with port 524b in the manual selector valve M, and is also connected by conduit 528 with radial port 528a near the left hand end of shift valve S. It will be seen that no pressure is admitted through annular port 524a when the manual selector valve M is in its neutral "N," drive "D," or reverse "R" positions, as will subsequently be described in detail.

The shift valve S includes a valve member 532 having a right hand land 532a of relatively small diameter, three centrally disposed lands 532b, 532c and 532d of equal and larger diameter, and a left hand land 532e of still larger diameter. A radial port 534a is disposed at its left hand end and communicates with conduit 534 connecting with the governor G. When shift valve member 532 is in its left hand position, as shown in the drawing, radial ports 528a and 535a connecting with coast clutch B through conduit 535, are uncovered by land 532d. At the same time, land 532c covers vent port 536 connecting with the sump, and land 532b covers port 538a, which is connected with port 538b in brake valve H, through conduit 538. Also, land 532b uncovers port 540a which is connected to the right hand end of the shift valve S, through passageway 540. In addition, the right hand land 532a closes port 522b connecting with the low valve L through conduit 522. When shift valve member 532 is in its right hand position, land 532a uncovers port 522b, land 532b closes port 540a and opens port 538a. Land 532c uncovers vent port 536, thereby permitting fluid from the coast clutch B to be vented therethrough to the sump. Also, land 532d closes port 528a.

The coupling valve H includes a valve member 560 having left and right hand lands 560a and 560b of equal diameter. A coil spring 562, interposed between the right hand side of valve member 560 and the adjacent end 564 of the valve housing, urges valve member 560 to the left so that land 560a uncovers port 538b, admitting pressure from the shift valve S. Pressure from line 538 and port 538b is thus permitted to flow between lands 560a and 560b to radial port 570a which is connected by line 570 with the inlet 572 of the fluid coupling F. A restricted orifice 574 is connected in series with line 570 to retard fluid flow therethrough. Further, it will be seen that land 560b closes port 576a which communicates with the manual selector valve M through line 576. Pressure from conduit 576 is also admitted to the left hand side of the coupling valve member 560, through branch conduit 578, which acts to move valve member 560 to the right, against the action of spring 562. When valve member 560 is in its right hand position, land 560a closes port 538b, and land 560b uncovers port 576a, permitting pump pressure to be admitted through the latter to the coupling F.

The fluid coupling F has an outlet port 590 disposed near its outer perimeter, which communicates with a centrally disposed radial port 592 in the side of exhaust valve E. The exhaust valve E includes a valve member 594 having left and right hand lands 594a and 594b, respectively, of equal diameter. A coil spring 596 retained between the right hand end of the valve member 594 and the adjacent end 597 of the exhaust valve, normally moves valve member 594 to its left hand position (as shown in the drawing), and spring 596 has a greater force than coupling valve spring 562. In its left hand position it will be seen that valve land 594a uncovers an exhaust port 598 communicating with the sump. When fluid pressure is admitted by the coupling valve H to line 570 which communicates with the coupling inlet 572, pressure from line 570 is also delivered through conduit 600 to the left hand end of the exhaust valve member 594 through a radial port 600a. The pressure from line 600 tends to move valve member 594 to its right hand position, against the action of the coil spring 596, whereupon land 594a closes the vent port 598, thereby preventing the coupling F from being exhausted of fluid. When pressure in line 576 drops a slight amount as for example when line 576 is vented to the sump through the manual selector valve vent port 580, the greater force of spring 596 as compared with spring 562 moves valve member 594 sufficiently to the left, that the exhaust valve inlet port 592 connects with vent port 598 before the coupling valve member 560 can close port 570a from port 576a. In this connection, those familiar with the art will appreciate the fact that the centrifugal force developed by the engine driven runner 70 assists in rapidly venting the coupling F of fluid.

The reverse valve J includes a valve member 620 having two lands, 620a and 620b of equal diameter, formed near the opposite ends thereof. Governor pressure from line 534 is delivered through line 622 to the left hand end of valve member 620, thereby moving the latter to the right, against the action of coil spring 624 which bears against the right hand side of the reverse valve member. When valve member 620 is moved to its left hand position, land 620a uncovers radial port 626a, which communicates with port 626b in the manual selector valve M, through line 626. Thus, pressure from line 626 is permitted to flow between lands 620a and 620b to a centrally disposed radial port 628a, and thence through line 628 to the reverse servo 630. When governor pressure is admitted through line 622 to the left side of valve member 620, the latter is moved to the right, whereupon land 620a covers port 626a, and land 620b uncovers vent port 632. As a result, fluid from the reverse servo line 628 is permitted to flow between lands 620a and 620b to vent port 632, and thence to the sump. As previously mentioned, the governor G delivers governor pressure only when the vehicle is operating in the forward driving direction, and therefore reverse valve J is conditioned to exhaust fluid from the reverse servo 630 at all times except when the vehicle is standing still or operating in reverse drive. Also in this connection, it will be apparent upon reading the following description of the operation of the controls that when the manual selector valve M is in its neutral position or any position except reverse, no pressure is admitted to reverse servo line 626, and thus, regardless of the position of reverse valve J, reverse servo 630 cannot be operated.

Before proceeding with a description of the operation of the controls above described, it will be noted that the system includes a park blocker valve K which is connected with the governor pressure line 534 through branch conduit 634. The park blocker valve K includes a small piston 636 which is biased to the left against the action of governor pressure by coil spring 638. Thus, whenever governor pressure is admitted to line 534, piston 636 is moved to the right against the action of spring 638 holding the park locking pin 640 in its right hand position thereby insuring that the conventional park locking mechanism is fully disengaged. It will be understood that pin 640 may be connected to any conventional type of wheel locking mechanism, and the form of the latter or its mode of operation does not constitute a part of this invention.

Operation of controls

The manual selector valve M includes a manually operated valve member 650 which, as previously explained, may be moved to any one of five positions indicated at 408. The manual selector valve member 650 has lands 650a, 650b of equal diameter, which in their neutral positions, are disposed just to the left of port 445a and to the left of the reverse servo line port 626b, respectively. Thus, when the engine is operating, pump pressure from lines 430, 443 and branch conduit 472 is admitted between lands 650a and 650b, and is permitted to flow only through port 445a to the right end of the regulator valve R through line 445. As previously explained, pump pressure acting on the right hand side of regulator valve lands 426d and 426e moves the valve to the left, thereby permitting pump pressure from line 443 to flow through line 444 of valve D and thence to converter C. Therefore, it will be seen that as soon as the engine is operating, the control system is first filled with pressure fluid, the converter C is then filled with fluid and is prepared to drive the vehicle when the manual selector valve M is moved to one of its driving positions.

When the manual selector valve member 650 is moved to its normal drive "D" position, as is illustrated in Figure 3, it will be seen that land 650b still blocks off the reverse servo port 626b, and land 650a is positioned to the left of port 445a and also to the left of radial port 652a. Thus, pump pressure from conduit 472 is permitted to flow through port 445a to the regulator valve R, and also through line 652 to the forward servo which is then conditioned to apply the forward drive band 98 to drum 92, as shown in Figures 1 and 2. Pump pressure from line 652 is also admitted through conduit 550 connecting with the shift valve S.

Under these conditions, it will be seen that as the engine accelerator 482 is depressed, throttle valve member 480 is moved sufficiently to the left so that proportional pressure is admitted to passageway 516, and thence to port 516b in the low valve L. Due to the action of spring 501, low valve member 500 is then in its right hand position so that land 500a uncovers port 516b, permitting pressure to flow therethrough to line 518 connecting with the right hand side of shift valve S. Assuming that the vehicle is operating at relatively low speeds, little or no governor pressure is admitted to the left hand side of shift valve S through line 534. Thus the pressure from line 518 acts upon the right hand side of land 532a moving shift valve member 532 towards its left hand position. As valve member 532 is moved towards the left, valve land 532b uncovers port 540a, whereupon pressure from line 518 is admitted through passageway 540 to the right side of land 532b. Due to the increased valve surface area then being acted upon by the pressure in line 518, shift valve member 532 is thereupon moved rapidly and held positively to its full left hand position.

When the shift valve member 532 is in its left hand position, as shown in Figure 3, it will be seen that pump pressure from line 550 is not permitted to flow to the coupling valve H through line 538, since valve land 532b then covers port 538a. As a result, no pressure can flow to coupling F, and the fluid, if any, in coupling F is exhausted through vent port 598 in exhaust valve E. It will be seen that the transmission is then conditioned to operate in low range drive and also, as previously explained, when the vehicle speed increases and the second stage turbine 42 approaches the speed of impeller 20, as described in connection with Figures 1 and 2, the second stage turbine 42 drives carrier 140 of planetary gears P and thus output shaft 178 is then conditioned to operate in an intermediate driving range.

As the vehicle speed increases still further, and a proportionately increased governor pressure is admitted through line 534 to the left side of shift valve S, shift valve member 532 tends to move to the right against the action of the throttle pressure acting against its right hand end.

Under predetermined conditions of governor and throttle pressures, say for example when the vehicle is operating under normal conditions at approximately 26 M. P. H. shift valve member 532 is moved towards the right so that land 532b closes port 540a. Thereupon, due to the decrease in valve surface area acted upon by the throttle pressure, valve member 532 is moved positively and rapidly to its full right hand position. Under these conditions, it will be seen that land 532b uncovers port 538a and thus pump pressure from line 550 is permitted to flow therethrough to the coupling valve H and thence to coupling F, and also to the left side of the coupling exhaust valve E. As previously explained, exhaust valve member 594 is thereupon moved to its right hand position closing vent port 598. As described in connection with Figures 1 and 2, the transmission is then conditioned to operate in direct or high range drive since both sun gears 134 and 164 of the planetary gear system P are then driven at substantially a 1:1 ratio with respect to input shaft 10.

While operating in high range under normal throttle conditions, if the engine accelerator 482 is moved rapidly towards its maximum throttle position 482a, a proportionately increasing throttle pressure is admitted to shift valve S through line 518, and may under some conditions overcome the effect of the governor pressure, thus moving shift valve S to its left hand position. When this occurs, pump pressure from line 550 cannot flow to the coupling F, and the fluid in coupling F is exhausted through vent port 598 of exhaust valve E when the pressure in lines 570 and 600 drop a relatively slight amount due to leakage in the system. This again establishes the intermediate drive wherein the gear system P is unlocked, but yet the converter gears G may still drive at a 1:1 ratio.

Similarly, this condition can be produced at any time if while operating under normal conditions at high range, the accelerator pedal 482 is moved beyond its maximum throttle position to its kick-down position 482b, kick-down rod 512 moves low valve member 500 to its left hand position, against the action of spring 501. Under these conditions, it will be seen that low valve land 500a closes port 516b, thus preventing throttle pressure from flowing from line 518 to the shift valve S. However, lands 500b and 500c uncover ports 520b and 520a, respectively, whereupon pump pressure from line 443 and branch conduit 474 and passageway 520 is permitted to flow between lands 500a and 500b and 500c to port 518a and 522a, and thence through lines 518 and 522 to ports 518b and 522b in shift valve S. Also, pump pressure from passageway 520 is permitted to flow between lands 500c and 500b to port 522a and thence through line 522 to port 522b in shift valve S. If under these conditions shift valve S is in its right hand position, port 522b is uncovered by land 532a and the pressure admitted therethrough acts upon the right hand side of land 532b. As a result, the shift valve member 532 is moved rapidly to the left assisted by pump pressure from line 518 acting on land 532a. As land 532a closes port 522b, land 532b uncovers port 540a. Therefore, it will be seen that at all times during the leftward movement of shift valve member 532 pump pressure acts on the combined surface areas of lands 532a and 532b with the result that shift valve S is moved rapidly and held positively in its left hand position. As explained above, this causes the coupling F to be exhausted of fluid and thus conditions the transmission to operate in an intermediate or low range drive.

In this connection, it will be appreciated that the shift valve S may be arranged so that above a predetermined vehicle speed, governor pressure will be of a sufficiently high value to prevent the left hand movement of the shift valve member 532. For this purpose, the surface area of left hand land 532e may be made sufficiently large so that the force applied by governor pressure above a predetermined vehicle speed is sufficient to overcome the force of pump pressure acting on lands 532a and 532b.

When the manual selector valve M is placed in its manual low "L" position, land 650a is moved to the left side of port 524b. As a result, the system is conditioned to operate in the same manner as in the normal forward drive "D" position, except that pump pressure admitted through port 472a flows between lands 650a and 650b to port 524b. The pump pressure thus admitted through port 524b flows through conduit 524 to port 524a in the low valve "L." Pressure admitted through port 524a moves low valve member 500 to its left hand position due to the larger surface area of land 500d as compared with that of the adjacent land 500c. As a result, pump pressure from conduit 524 is permitted to flow between lands 500c and 500d to port 529, and thence through line 528 to radial port 528a in shift valve S. As previously explained, when the low valve L is moved to its left hand position, shift valve S is also rapidly and positively moved to its left hand position, thereby causing the coupling F to be exhausted of fluid and thereby conditioning the transmission to operate in low or intermediate range. At the same time, pump pressure flowing from the low valve L through line 528 flows between lands 532c and 532d of shift valve S and thence through conduit 535 to the coast clutch B. The pressure from line 535, it will be seen, moves coast clutch piston 120 into engagement with clutch elements 108a and 108b and, as explained in connection with Figures 1 and 2, this maintains a direct driving relationship between the input and output shafts of the transmission.

In this connection, it will be noted that if for any reason shift valve S is not moved to its left hand or low range engaging position, pump pressure cannot flow to the coast clutch through port 528a, since the latter is closed by land 532d, and at the same time pressure in line 535 is vented through vent port 536, which is then uncovered by land 532c.

One of the features of the above described operation of the controls in the manual low position is that an upshift from a low to an intermediate driving range may be accomplished. As previously described, this occurs when the speed of rotation of the second stage turbine 42 approaches the speed of rotation of impeller 20, thereby driving the pinion carrier 140 at a 1:1 ratio with input shaft 10. In addition, an upshift to high range may also occur in manual low, at high vehicle speeds, for example, 55 M. P. H., since the shift valve S may be moved to the right, when a proportionately high governor pressure is admitted to the left side thereof.

When the manual selector valve M is moved to its braking "B" position, land 650a of selector valve member 650 is moved to the left hand side of port 576b, and land 650b is moved just to the right side of pump pressure inlet port 472a. Under these conditions, pump pressure is admitted to the same lines as in the manual low "L" position, except that pump pressure from port 472a is permitted to flow between lands 650a and 650b to port 576b, and thence through line 576 to the coupling valve H. The pressure thus admitted to the left side of coupling valve member 560 moves the latter to its right hand position so that pump pressure from line 576 is permitted to flow between the lands to line 570. As a result, coupling F is filled with fluid. It will be noted that the coupling will remain filled with fluid regardless of the position of shift valve S; port 538b then being covered by land 560b. At the same time, providing, of course, that shift valve S is moved to its left hand or low range position, pump pressure from low valve line 528 is admitted to coast clutch B through line 535, thereby effecting the engagement of coast clutch B. In other words, when the manual selector valve is in its braking "B" position, the coupling F is immediately filled with fluid, but the coast clutch B will be operated only if shift valve S is conditioned to effect the operation of low or intermediate range. It will be appreciated, however, that the present control system may be modified if desired so that the coast clutch B is rendered operative, at all times when the manual selector valve M is placed in its braking "B" position. Under these conditions, as described in connection with Figures 1 and 2, a high degree of braking action for the rear wheels of the vehicle is developed due to the differential in the speeds of the vehicle overdriven turbine and the coupling and engine braked impeller of the converter C.

To condition the transmission to operate in reverse drive, the manual selector valve member 650 is moved to its "R" position. Thus, land 650b is positioned on the right hand side of the reverse valve inlet port 626b and land 650a is positioned just to the left of pump pressure inlet port 472a. As a result, all other ports in the manual selector valve M are closed to pump pressure and are vented through vent port 580, and the pump pressure admitted through port 472a flows between lands 650a and 650b to reverse valve inlet port 626b. Also in this connection, it will be noted that in all of the positions of the manual selector valve member 650 except reverse, port 626b is closed to pump pressure by land 650b. Pump pressure thus admitted to line 626 flows between lands 620a and 620b of reverse valve member 620, which is then in its left hand position, as shown in Figure 3, since no governor pressure is then available to oppose the action of reverse valve spring 624. As a result, pump pressure flows from reverse valve J through line 628 connecting with the reverse servo 630 and, as previously explained, the latter applies reverse band 178 to drum 170 and the transmission is conditioned to operate in reverse drive. It will also be noted that when the manual selector valve M is in its reverse "R" position, left hand land 650a is moved to the right of port 652a, thereby permitting the forward servo pressure in line 652 to be vented to the sump through selector valve vent port 580.

From the above description of the transmission controls, it will be apparent that the individual valves, as well as the control arrangement, may be varied in various ways apparent to those skilled in the art or, if desired, an entirely different type of control arrangement may be used to operate the transmission shown in Figures 1 and 2. It will also be appreciated that the transmission arrangement may be modified in various ways, apparent to those skilled in the art, and therefore it is to be understood that the above specification, as well as the accompanying disclosures are for the purpose of illustration only and should not be construed as limiting the scope of the following claims.

I claim:
1. A vehicle transmission and control system for throttle controlled engines comprising a fluid torque converter, first, second and third actuatable means to engage different driving speed ratios, a fluid pressure supply means, a shift valve means movable in one position to admit fluid pressure to the second actuatable means and movable in another position to admit fluid pressure to the third actuatable means, a manual selector valve means having a plurality of forward speed selector positions connecting with the supply means, the shift valve means and the first actuatable means, which is adapted to admit fluid pressure to the first actuatable means when in any of its forward speed selector positions, said selector valve means also having a manual low selector position for admitting fluid pressure to the shift valve means to thereby engage the third actuatable means when the shift valve means is in said another position, said selector valve means having a coast brake position adapted to admit fluid pressure to the second actuatable means and also to the shift valve means tending to move the latter to said another position to thereby engage said third actuatable means, speed responsive governor means connecting with the supply means adapted to admit proportional governor pressure with respect to vehicle speed to the shift valve means, tending to move the latter to said one position, and a throttle responsive valve means connecting with the supply means adapted to admit a proportional throttle pressure with respect to the throttle position to the shift valve means, tending to move the latter to said another position in opposition to the governor pressure.

2. A transmission and control system for accelerator pedal operated vehicle engines comprising a torque converter, a first actuatable means to engage a forward driving speed range, a second actuatable means for forward high range driving speed, and a third actuatable means for coast braking the vehicle through the transmission, fluid pressure supply means, a speed responsive governor connecting with the supply means for delivering a proportional governor pressure with respect to vehicle speed, a throttle valve means for delivering a proportional throttle pressure with respect to the movement of the accelerator pedal, shift valve means connecting with the supply means movable in one position by governor pressure to admit fluid pressure to the second actuatable means and movable in another position in response to throttle pressure acting in opposition to governor pressure to admit fluid pressure to the third actuatable means, a low valve means connecting with the supply means movable in one position to admit fluid pressure to the shift valve means to move the shift valve to said another position, a manual selector valve means having forward drive and coast braking positions in which it is adapted to admit fluid pressure to the first actuatable means and to the shift valve means, and when in its coast braking position to admit fluid pressure to the second actuatable means and also to the low valve means to move the latter to its said one position to thereby condition the shift valve means to admit fluid pressure to the third actuatable means.

3. A transmission and control system as described in claim 2 including a pressure regulator valve, means connecting with the supply means for initially supplying and maintaining a predetermined fluid pressure in the converter before a forward driving speed range is engaged.

4. A transmission and control system as described in claim 2 including valve means to control the fluid pressure flow from the shift valve means to the second actuatable means, which is normally adapted to admit fluid pressure thereto from the shift valve means, and which is adapted to be conditioned to admit fluid pressure to the second actuatable means when the manual selector valve is moved to its coast braking position.

5. A transmission and control system as described in claim 2 wherein the second selectively actuatable means includes a fluid coupling having inlet and exhaust ports, valve means having an inlet port connecting with the shift valve means and an outlet port connecting with the coupling inlet port, resilient means to normally position said valve means in one position to admit fluid pressure from the shift valve through said inlet port to the coupling inlet port, said valve means also having a second inlet port connecting with the manual selector valve which is closed when the valve means is in one position; said selector valve when in its coast braking position being adapted to admit fluid pressure to said valve means to move the latter to another position to admit fluid pressure through the second inlet port to the coupling inlet port, and exhaust valve means connecting with the coupling exhaust port and the valve means outlet port which is adapted to close the exhaust port whenever fluid pressure is delivered to the valve means outlet port.

6. A transmission as described in claim 2 wherein the manual selector valve has a manual low position in which it is adapted to admit fluid pressure to the low valve means to move the latter to its said one position to thereby condition the shift valve means to admit fluid to the third actuatable means.

7. A transmission as described in claim 2 including means responsive to the movement of the accelerator pedal beyond its maximum throttle position to move said low valve means to its said one position.

References Cited in the file of this patent

UNITED STATES PATENTS

| | | |
|---|---|---|
| 2,671,357 | Foley | Mar. 9, 1954 |
| 2,697,363 | Sheppard | Dec. 21, 1954 |
| 2,737,824 | Livermore | Mar. 13, 1956 |
| 2,737,827 | Seybold | Mar. 13, 1956 |
| 2,761,328 | Herndon et al. | Sept. 4, 1956 |

FOREIGN PATENTS

| | | |
|---|---|---|
| 666,092 | Great Britain | July 12, 1949 |